(No Model.)

O. B. SHALLENBERGER.
REGULATOR FOR ELECTRIC MOTORS.

No. 347,964. Patented Aug. 24, 1886.

WITNESSES:
Darwin S. Wolcott
C. M. Clarke

INVENTOR,
Oliver B. Shallenberger.
George H. Christy
Att'y.

N. PETERS, Photo-Lithographer, Washington, D. C.

UNITED STATES PATENT OFFICE.

OLIVER B. SHALLENBERGER, OF ROCHESTER, PENNSYLVANIA.

REGULATOR FOR ELECTRIC MOTORS.

SPECIFICATION forming part of Letters Patent No. 347,964, dated August 24, 1886.

Application filed March 15, 1886. Serial No. 195,205. (No model.)

*To all whom it may concern:*

Be it known that I, OLIVER B. SHALLENBERGER, residing at Rochester, in the county of Beaver and State of Pennsylvania, a citizen of the United States, have invented or discovered certain new and useful Improvements in Regulators for Electric Motors, of which improvements the following is a specification.

Figure 1:
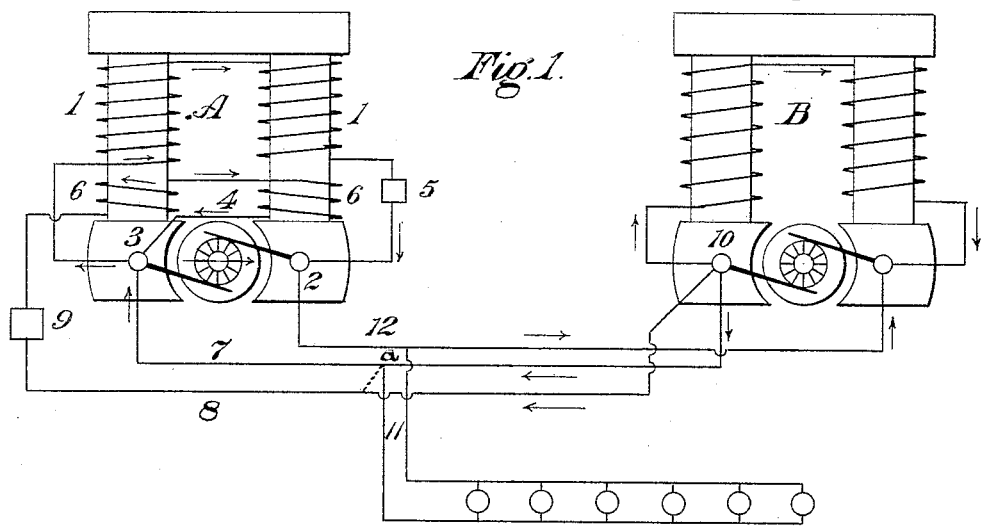
Figure 2:
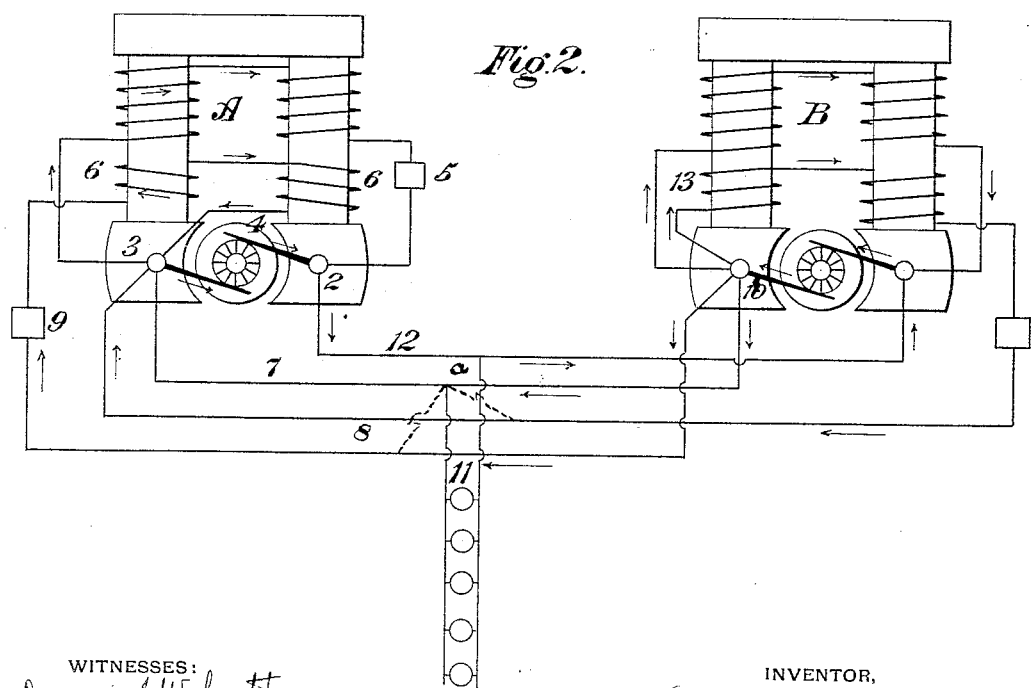

In the accompanying drawings, which make part of this specification, Figure 1 is a diagrammatic view of an electric motor and an ordinary shunt-wound dynamo-electric generator embodying my invention. Fig. 2 is a similar view showing a modified form of generator.

In Patent No. 337,628, granted to me March 9, 1886, I have described and claimed means for regulating dynamo-electric machines for the purpose of maintaining a constant difference of potential in the external or work circuit of such machines under variable conditions of work in said external circuit. The invention herein, however, relates to the regulation of electric motors for the purpose of maintaining a constant speed of rotation of the armature of such motor under varying loads and under varying conditions of potential due to the resistance of conductors.

An approximately constant speed of rotation independent of the load can be maintained in a motor within its capacity, working to a constant difference of potential at its armature terminals, if its armature have a sufficiently low resistance, and its field-coils, placed in a derived circuit to the armature, have a relatively high resistance. As the above conditions of working depend upon well-known laws, further explanation thereof is unnecessary.

In practice it is difficult to construct the armature of a motor of sufficiently low resistance to obtain a reasonable regularity of uniformity of speed under varying conditions of work, even when it is possible to maintain a constant difference of potential at the terminals of said armature; and, furthermore, it is impracticable to maintain a constant difference of potential at the armature terminals with large variations of current, owing to the large size and high cost of conductors necessary for the purpose, except for very short distances, or by the use of some special device.

I am aware that systems of compound winding have been devised for the purpose of obviating these difficulties; but in order that they may accomplish the desired result each machine must be adapted in its winding to the circuit upon which it is intended to work, otherwise the compensating effect of the series coils will be either insufficient or too great. Moreover, when a motor of such construction is working in a derived circuit with other translating devices the variations of current due to such devices will seriously affect the working of the motor, unless the conductors be of such large size as to maintain a practically constant difference of potential throughout the circuit.

The object of the invention herein is to so construct the motor and connect the same with a generator that an approximately constant speed of rotation may be automatically maintained in the motor under varying conditions of load, and under varying differences of potential at the terminals of the armature of the motor.

The armature of a motor will rotate at a constant speed with varying load and varying differences of potential at its terminals, provided the field strength of the motor is always proportional to its counter electro-motive force. This follows directly from the relation $e=fs$, (where $e$=counter electro-motive force, $f$=field-strength, and $s$=speed,) and if $s$ be made constant $e$ varies, as $f$ or $\frac{e}{f}$=a constant. In order to work under these conditions the field-magnets of the motor A are wound with coils 1 of high resistance connected in shunt or derived circuit to the terminals 2 and 3 of the armature 4, and so proportioned as to produce sufficient field strength when the motor is doing no work to obtain the desired speed. The final adjustment of speed to the conditions of applied electro-motive force is obtained by introducing more or less of the resistance 5 into the circuit of the field-coils 1. In addition to the coils 1, regulating-coils 6 are wound upon the field-magnets of the motor, one extremity of the circuit of said coils 6 being connected to the terminal 3 of the armature 4, and the other extremity of said circuit being connected to the main conductor 7, leading from the same terminal 3 to one of the terminals 10 of the generator B, at or near the point of attachment of said conductor 7, to said terminal of the generator by a wire, 8, of low resistance relatively to that of the coils themselves. In place of this particular arrangement, any of the arrangements of coils described in the patent above referred to as applied to the generator may be employed. The arrangement of the coils in the generator serves to increase the normal electro-motive force produced by the main field-coils, while in the motor these secondary coils 6 tend to reduce the field-strength produced by the main coils 1. An adjustable resistance, 9, is also placed in circuit with the regulating-coils 6 for final adjustment. Any loss of potential between the extremities of the conductor 7 will evidently cause a difference of potential corresponding in value to the loss in the conductor 7 (neglecting the small resistance of the wire 8) to exist between the extremities of the regulating-coils 6, and cause a current to flow through these coils proportionate to such difference.

Suppose the motor to be running with no load except its own friction. Then the current through the armature 4 and conductor 7 will be very small, and consequently the difference of potential between the terminals of the regulating-coils 6 will also be very small, so that the field is charged almost entirely by the main coils 1 in shunt to the armature. The desired speed is obtained by adjusting the resistance 5 in circuit with the main coils. Let the full load for which the motor is intended be now thrown in, and suppose, first, that there is no loss in the main conductors, and hence no flow of current in the regulating-coils 6. This increase of load is accompanied by a decrease in speed. The increased current in the armature necessary to do the additional work depends upon the difference between the applied electro-motive force and the counter electro-motive force and the resistance of the armature. This is expressed algebraically by the formula $c = \frac{E-e}{r}$. Now, since the applied electro-motive force E and the resistance $r$ remain constant, it is evident that the counter electro-motive force $e$ must decrease in value in order that the required current $c$ may flow; but since the applied electro-motive force has been supposed constant for the time being the field-strength must also be constant; and, furthermore, since $e = fs$, the speed $s$ must vary as the counter electro-motive force $e$ when the field-strength $f$ is constant; hence the decrease in the counter electro-motive force $e$ is accompanied by a falling off of speed. In order that the counter electro-motive force $e$ may reach its proper value without change of speed, it is only necessary that the field-strength $f$ should be proportionately diminished, or, as before stated, that the ratio $\frac{e}{f}$ should be maintained constant. Considering now the effect of the resistance of the main conductors connecting the terminals of the motor and generator without the action of the supplementary or regulating coils 6, it will be readily seen that the fall of potential or reduction of applied electro-motive force caused thereby will still further reduce the speed, since it affects the value of $E-e$ in much greater ratio than the field-strength $f$. By the action of the regulating-coils 6 these effects are counteracted, since the difference of potential between the extremities of the conductor 7 will cause a flow of current in these coils and in such a direction as to oppose the main or exciting coils 1, the coils 6 being so proportioned as to effect the necessary change in the field-strength to restore the speed to normal. These changes, although described consecutively, occur simultaneously, so that the speed remains practically unchanged. Having adjusted the resistance 9 in circuit with the regulating-coils for the normal speed at full load, the action of the coils 6 will be great or small, proportionately to the work done or current flowing in the main conductors, and will therefore maintain a constant or nearly constant speed for all loads from zero to maximum capacity.

When other translating devices are so connected as to derive current from the same system of conductors, the coils 6 will also tend to maintain a constant speed of the motor. As, for example, suppose a translating device 11 were thrown in circuit an increase of current would traverse the conductors 7 and 12, and a greater difference of potential would exist between the points 3 and 10, and consequently between the extremities of the coils 6 of the motor, thus compensating by the increase of current therein and consequent change in field-strength for the increased loss of potential.

When one or more motors derive current from the same circuit with other devices requiring a constant electro-motive force, I employ in connection with the motors regulated as described a generator with auxiliary exciting-coil 13, as described in the patent already referred to, and adjusted to maintain the electro-motive force constant in any desired portion of the circuit.

Referring to Fig. 2, 11 shows a derived circuit from the main conductors 7 and 12, in which the electro-motive force is to be maintained constant. In this case I adjust first the generator to maintain a constant electro-motive force at $a$ by means of its resistance, when an increase of current causes a rise of electro-motive force at the generator and a falling off of potential at any point beyond the point $a$, the total difference of potential along the main conductors will be the same for the same current flowing, whether the point of constant difference of potential be at or near the motor or the generator, or at some intermediate point. Having made this adjustment for the generator, the motor is then adjusted by means of the resistance in circuit with its main and regulating coils, so as to compensate for any variation of speed which would occur from its armature-resistance, and the fall of potential in the portion of the conductor 7 between its terminals and the point of constant potential *a*. Suppose, now, the motor and other translating devices to be in operation at the same time, and that the proper difference of potential exists at *a*, the motor doing work at its normal speed. If a decrease in the work done by the motor occurs, less current flows through the line, and the loss of potential is correspondingly diminished. This would have the effect of increasing the potential at *a* but for the action of the auxiliary coils 13 of the generator, which by the decrease of potential at their ends cause the electro-motive force of the generator to be reduced proportionately, so that the electro-motive force at *a* remains unchanged. The decrease of load would also increase the speed of the motor, as before shown, but the fall of potential in the line weakens the action of its regulating-coils 6, which reduces the speed to normal. An increase of load has the reverse effect, with an increased loss of potential in the conductors. In the same manner, also, throwing in additional translating devices at *a* causes like compensating effects by the increased loss of potential, and vice versa, so that for all variations of work done a constant potential is maintained at *a* and a constant speed of rotation of the motor's armature.

When translating devices are connected to the mains 7 and 12, between the motor and the generator, and a constant electro-motive force is required at that point, the wire 8, leading from the regulating-coils 6, should be connected, as indicated by dotted lines, to the main 7 at the point where a constant electro-motive force is desired. When a generator similar to that shown in Fig. 2 is employed to supply current to translating devices connected as shown in said figure, the outer end of the auxiliary coil 13 of the generator should be connected to the main 7 at the point where a constant electro-motive force is to be maintained.

I claim herein as my invention—

1. In a system of electrical distribution, the combination of a motor and the main coils thereof, secondary exciting coil or coils, main conductors connecting the armature-terminals of the motor with the terminals of a suitable generator, and a shunt-circuit including the secondary coil or coils and connecting the motor and the generator, the secondary coils being so wound and proportioned that any change of loss of potential in the main conductors between the generator and the motor will automatically increase or decrease the excitation of the magnetic field of the motor, and thereby maintain a constant speed of rotation of the armature of the motor under varying loads, substantially as set forth.

2. In a system of electrical distribution, the combination of an electric motor, conductors connecting the terminals of the motor with the terminals of a suitable generator, and regulating coil or coils on the field-magnets of the motor, the terminals of said coil or coils being connected, respectively, to a terminal of the motor and to one of the conductors, said regulating coil or coils being suitably wound and proportioned so as to vary their effect on the field-strength of the motor in inverse proportion to the difference of potential in the main conductor between the points of generation and consumption, substantially as set forth.

In testimony whereof I have hereunto set my hand.

OLIVER B. SHALLENBERGER.

Witnesses:
 DARWIN S. WOLCOTT,
 R. H. WHITTLESEY.